US010433676B2

(12) United States Patent
Colletti

(10) Patent No.: US 10,433,676 B2
(45) Date of Patent: Oct. 8, 2019

(54) CUTTING BOARD WITH DRAINAGE VALVE

(71) Applicant: Gregory J. Colletti, Belvidere, NJ (US)

(72) Inventor: Gregory J. Colletti, Belvidere, NJ (US)

( * ) Notice: Subject to any disclaimer, the term of this patent is extended or adjusted under 35 U.S.C. 154(b) by 153 days.

(21) Appl. No.: 15/801,219

(22) Filed: Nov. 1, 2017

(65) Prior Publication Data

US 2019/0125134 A1 May 2, 2019

(51) Int. Cl.

*A47J 47/00* (2006.01)
*B65D 47/30* (2006.01)
*A22C 17/00* (2006.01)

(52) U.S. Cl.

CPC ............ *A47J 47/005* (2013.01); *B65D 47/30* (2013.01); *A22C 17/0013* (2013.01)

(58) Field of Classification Search

CPC . B25B 11/00; B25B 11/02; A47J 47/00; A47J 47/005; B65D 47/30

See application file for complete search history.

(56) References Cited

U.S. PATENT DOCUMENTS 3,598,164 A 8/1971 August
4,907,789 A 3/1990 Tice
D317,551 S * 6/1991 King .............................. D7/638
5,527,022 A * 6/1996 Gibson ................. A47J 47/005 269/13
5,996,983 A * 12/1999 Laurenzi .............. A47J 47/005 269/15
6,386,531 B1 * 5/2002 Prosser ................. A47J 47/005 269/15
7,134,653 B1 * 11/2006 Ladenheim ........... A47J 47/005 269/302.1
8,251,357 B2 * 8/2012 Young .................. A47J 47/005 269/15
D687,268 S * 8/2013 Difante .......................... D7/698
9,066,626 B2 * 6/2015 Young .................. A47J 47/005
2005/0040580 A1 2/2005 Davis
2011/0308361 A1 * 12/2011 Hugo .................... A47J 47/005 83/13
2014/0339750 A1 11/2014 Constantino, Jr. et al.
2015/0257608 A1 9/2015 Torlai et al.
2016/0183733 A1 6/2016 Lee et al.
2019/0125134 A1 * 5/2019 Colletti ................ A47J 47/005

FOREIGN PATENT DOCUMENTS

FR 2313897 A1 1/1977

* cited by examiner

*Primary Examiner* — Lee D Wilson
(74) *Attorney, Agent, or Firm* — Richard C. Litman

(57) ABSTRACT

The cutting board with a drainage valve allows for the collection and drainage of liquids associated with cutting, slicing and chopping of foodstuffs. The cutting board has first and second longitudinally opposed ends, first and second laterally opposed sides, an upper surface and a lower surface. A liquid collection reservoir is defined in the upper surface adjacent the first longitudinally opposed end of the cutting board. At least one peripheral channel is defined in the upper surface of the cutting board and is in open communication with the liquid collection reservoir. A drainage port is formed through the lower surface of the cutting board adjacent the first longitudinally opposed end. The drainage valve is mounted in the cutting board for selectively controlling drainage of liquid from the liquid collection reservoir to the drainage port.

13 Claims, 6 Drawing Sheets

10
12
14
16
18
20
22
24
26
28
28
28
40
40
50

CUTTING BOARD WITH DRAINAGE VALVE

BACKGROUND

1. Field

The disclosure of the present patent application relates to food preparation, and particularly to a cutting board with a drainage valve, providing for the collection of liquids associated with cutting, slicing and chopping of foodstuffs, and further providing for the dispensing of the collected liquids.

2. Description of the Related Art

A cutting board is a common food preparation tool, typically formed from a durable material, such as wood or plastic, upon which meat, vegetables and the like are cut, chopped and sliced. Meats, vegetables and fruit, all of which are commonly cut on cutting boards, frequently produce a variety of juices and other liquids while being cut, chopped and sliced. Since a typical cutting board is simply a monolithic board with a planar cutting surface, the liquids are difficult to contain and often spill directly onto the user's countertop. Even if the user is able to keep the countertop free of spillage, transporting the board to the sink or garbage can, for example, to dispose of the liquids is a difficult task, requiring the user to awkwardly balance the cutting board to remain perfectly horizontal. It would obviously be desirable to be able to easily collect these liquids while using the cutting board, and then easily dispense the collected liquids into the sink or the like for disposal thereof. Thus, a cutting board with a drainage valve solving the aforementioned problems is desired.

SUMMARY

The cutting board with a drainage allows for the collection and drainage of liquids associated with cutting, slicing and chopping of foodstuffs. The cutting board has first and second longitudinally opposed ends, first and second laterally opposed sides, an upper surface and a lower surface. A liquid collection reservoir is defined in the upper surface adjacent the first longitudinally opposed end of the cutting board. At least one peripheral channel is defined in the upper surface of the cutting board and is in open communication with the liquid collection reservoir. A drainage port is formed through the lower surface of the cutting board adjacent the first longitudinally opposed end. The drainage valve is mounted in the cutting board for selectively controlling drainage of liquid from the liquid collection reservoir to the drainage port.

These and other features of the present disclosure will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
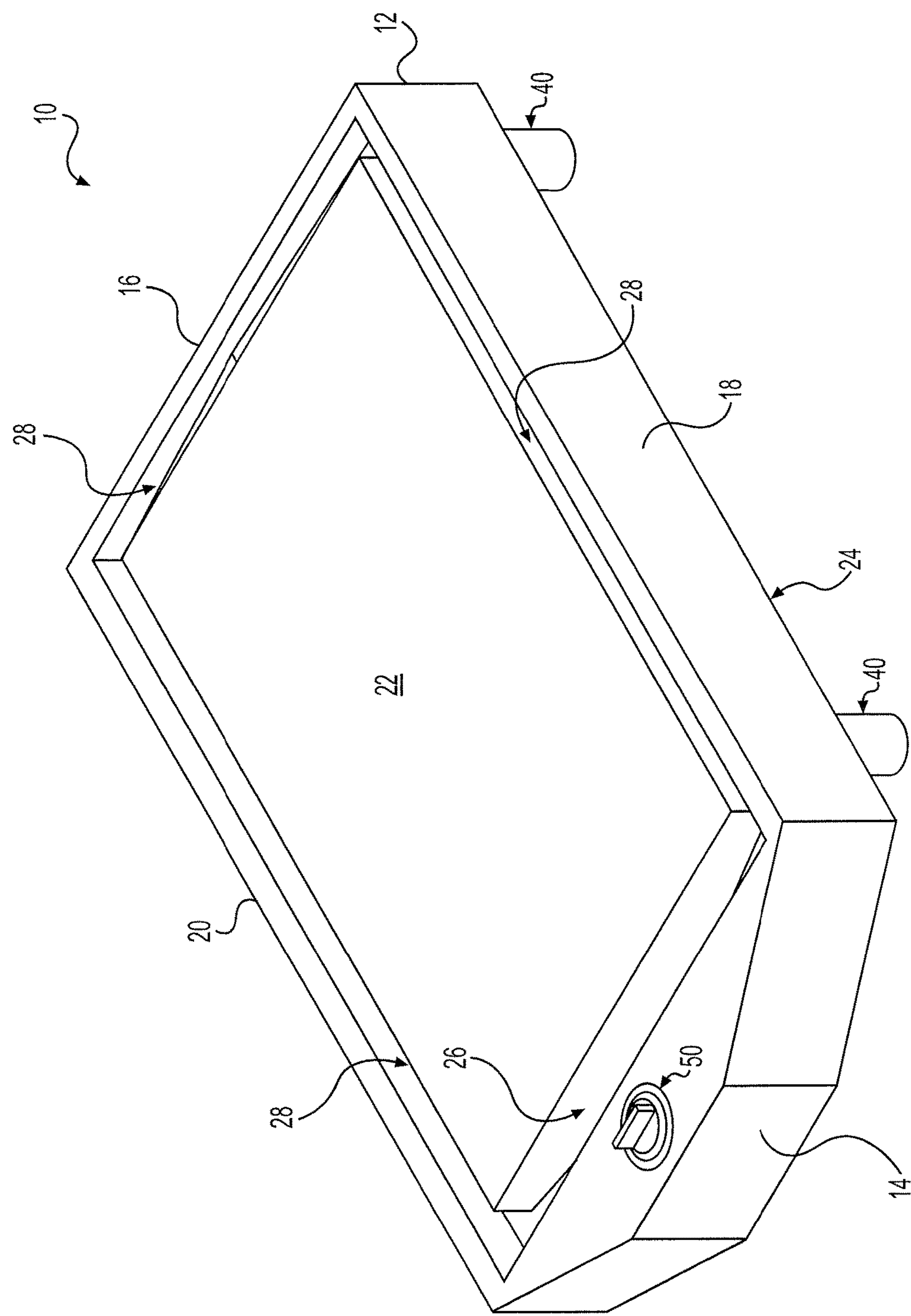
FIG. 1 is a perspective view of a cutting board with a drainage valve.

The cutting board with a drainage valve 10 allows for the collection and drainage of liquids associated with cutting, slicing and chopping of foodstuffs. The cutting board 12 may be formed from any suitable type of material, such as wood, plastic or the like. The cutting board 12 has first and second longitudinally opposed ends, 14, 16, respectively, first and second laterally opposed sides 18, 20, respectively, an upper surface 22 and a lower surface 24. Although shown in FIGS. 1-3, 5A and 5B as being substantially rectangular, it should be understood that the overall dimensions and configuration of the cutting board 12 are shown for exemplary purposes only.

Figure 2:
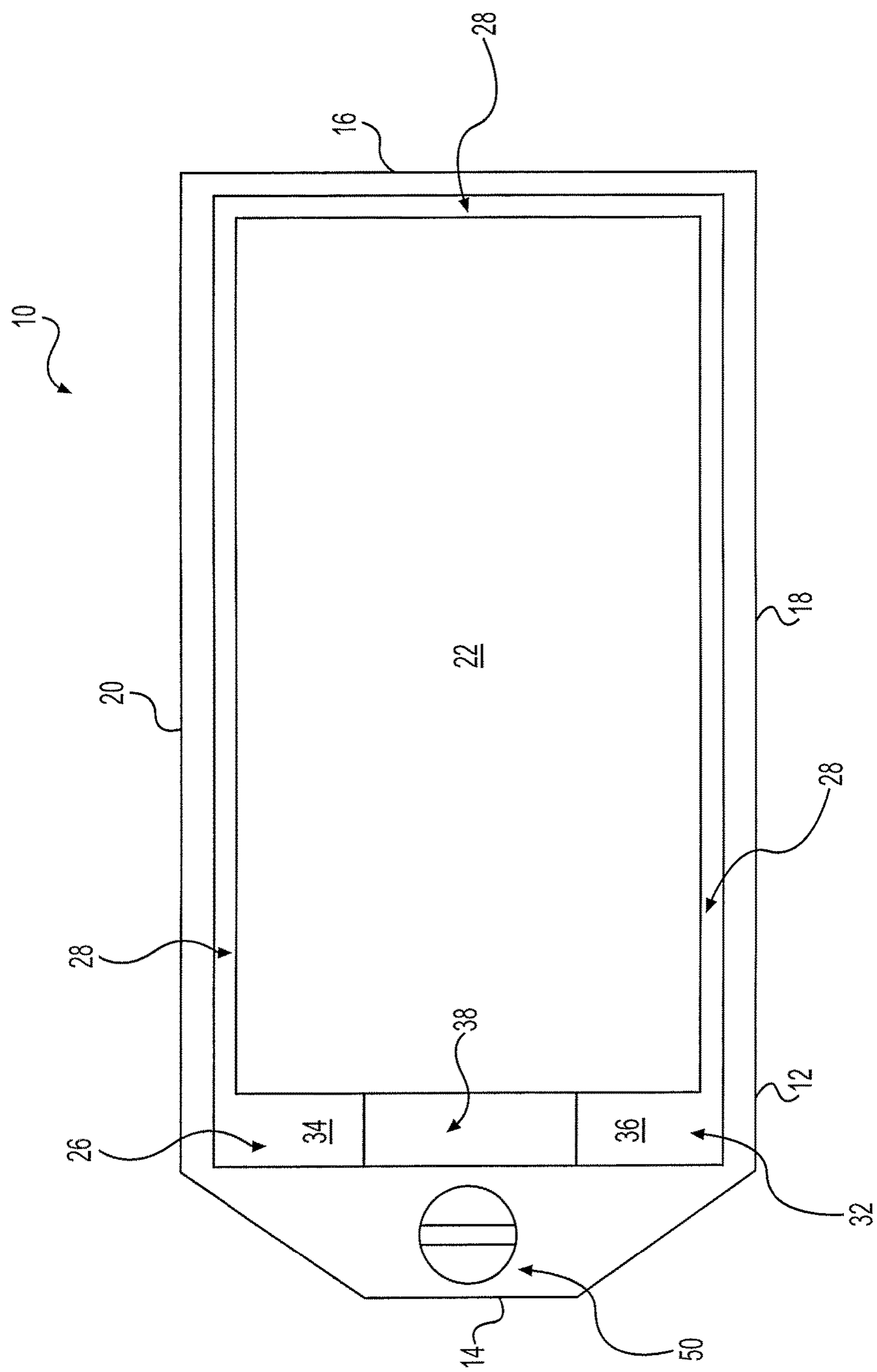
FIG. 2 is a top view of the cutting board of FIG. 1.
Figure 3:
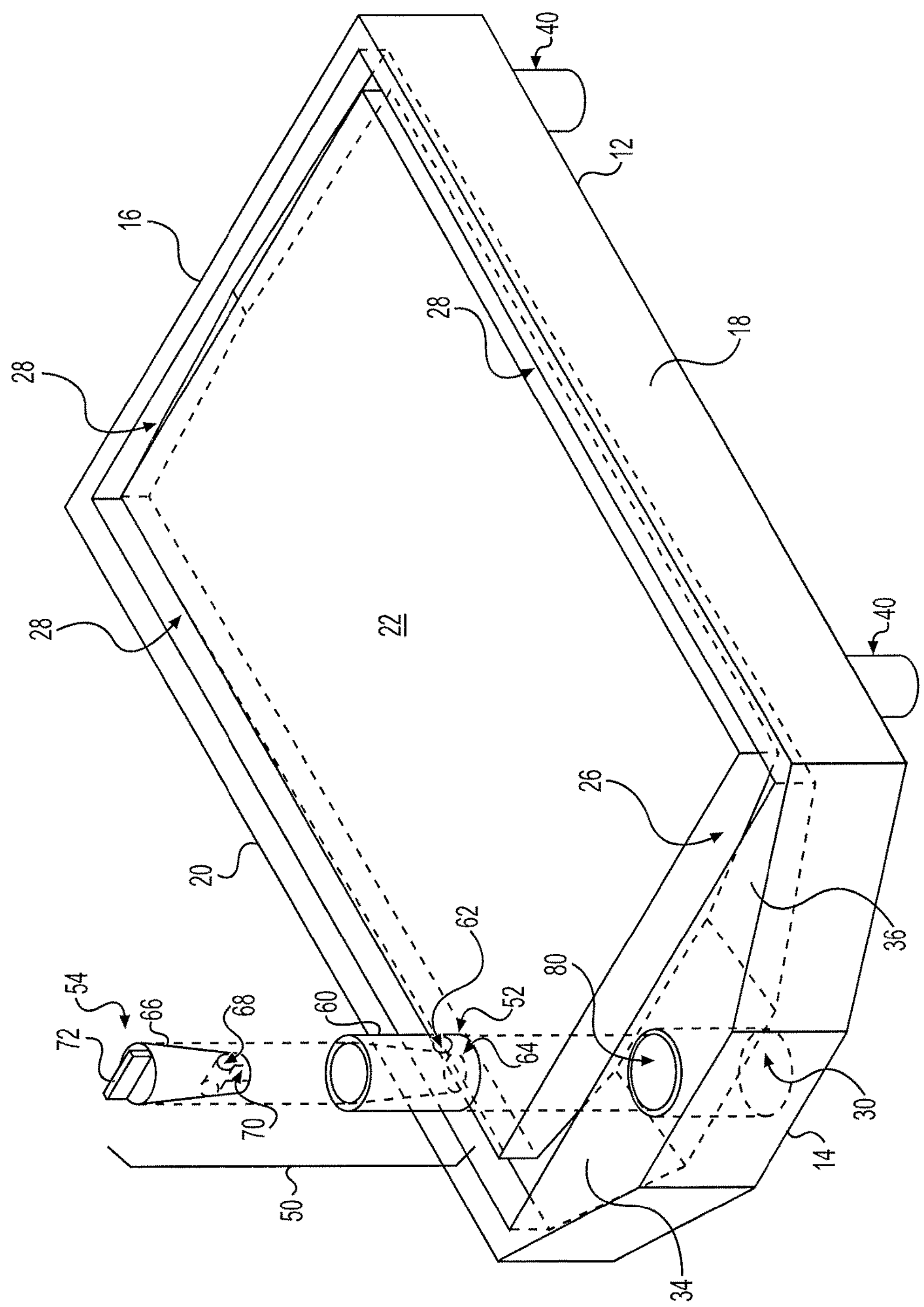
FIG. 3 is perspective view of the cutting board of FIG. 2, shown with the drainage valve exploded therefrom.
Figure 5A:
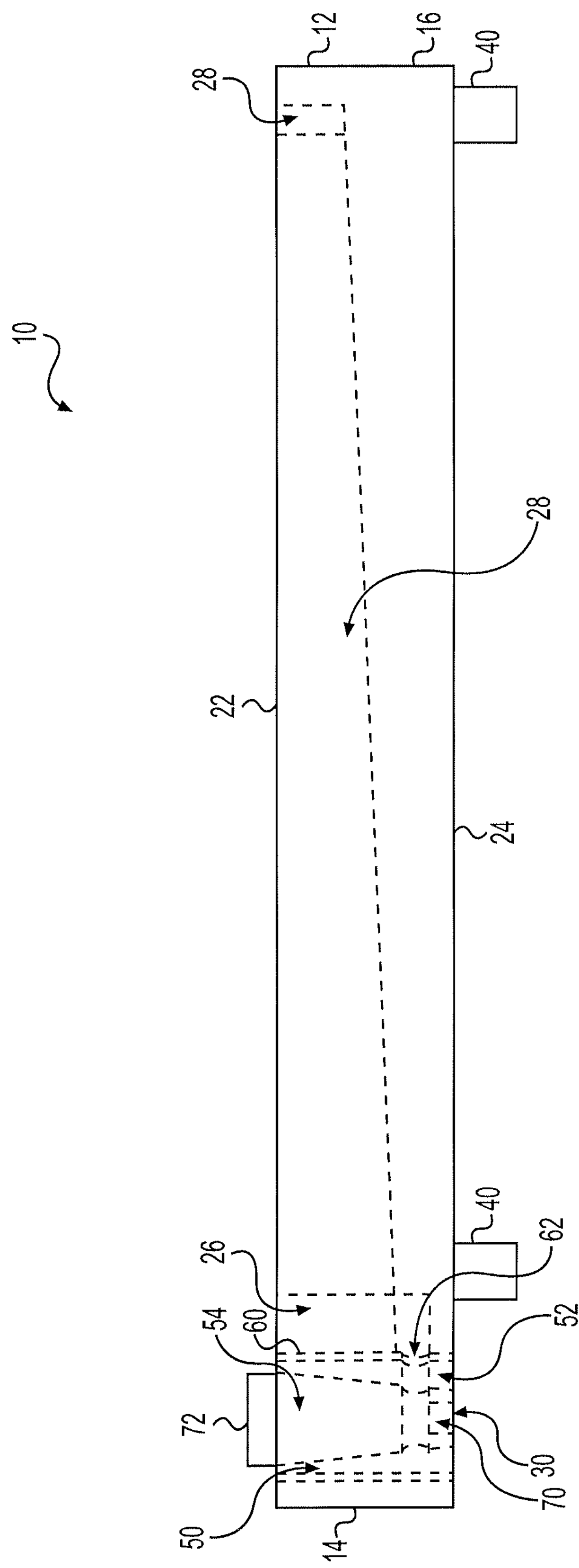
FIG. 5A is a side view of the cutting board of FIG. 1.

As shown, a liquid collection reservoir 26 is defined in the upper surface 22, adjacent the first longitudinally opposed end 14 of the cutting board 12. At least one peripheral channel 28 is defined in the upper surface of the cutting board 12 and is in open communication with the liquid collection reservoir 26. As best seen in FIG. 5A, at least a portion of the at least one peripheral channel 28 may be inclined downward from the second longitudinally opposed end 16 toward the first longitudinally opposed end 14, allowing the liquid to flow by gravity toward and into the liquid collection reservoir 26. Additionally, as best shown in FIGS. 2 and 3, the liquid collection reservoir 26 is partially defined by a floor 32, which is preferably divided into first and second portions 34, 36, respectively. Each of the first and second portions 34, 36 is downwardly inclined toward a central region 38 of the liquid collection reservoir 26, urging the liquid to flow by gravity toward the central region 38 and through drainage valve 50.

Figure 5B:
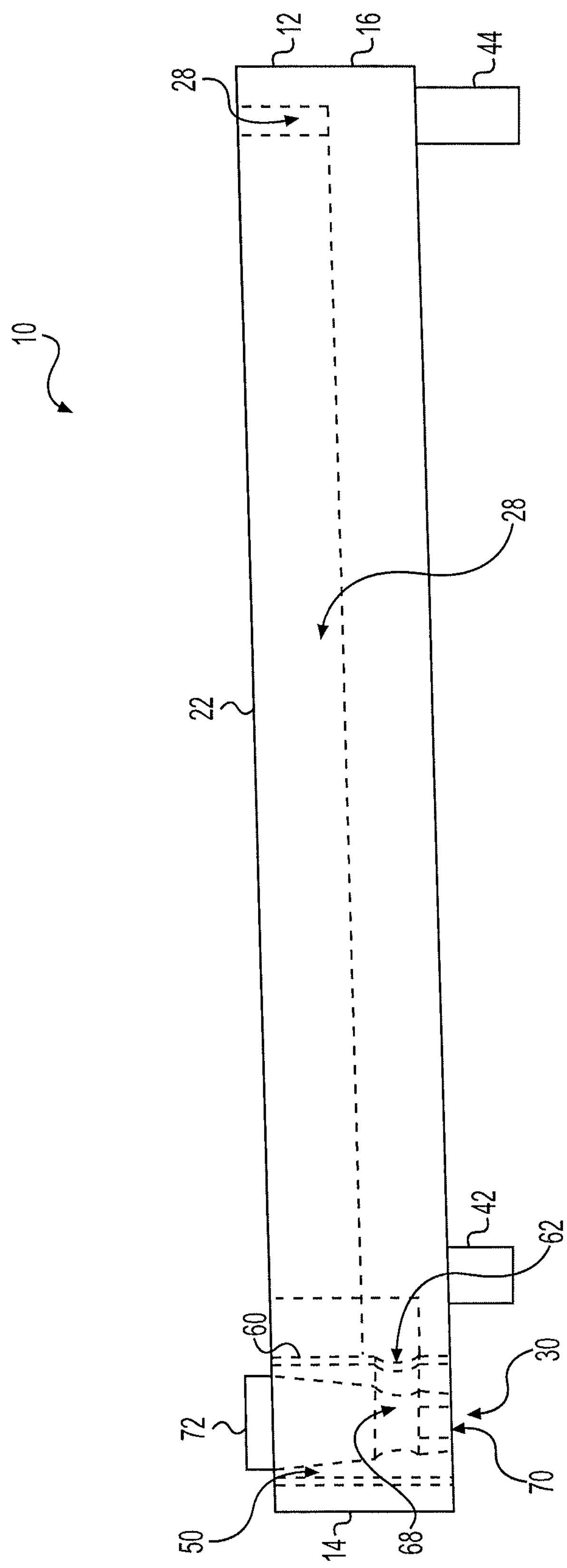
FIG. 5B is a side view of an alternative embodiment of a cutting board with a drainage valve.

As best shown in FIGS. 1 and 5A, a plurality of legs 40 are preferably secured to the lower surface 24 of the cutting board 12. The legs 40 preferably provide sufficient clearance for the drainage of the liquid from the drainage port 30, as will be described in greater detail below, into a sink or other waste receptacle. FIG. 5B illustrates an alternative embodiment which may be used in place of, or in addition to, the inclined portions of the at least one peripheral channel 28 as described above. In the embodiment of FIG. 5B, the plurality of legs is divided into a first set of legs 42 and a second set of legs 44. As shown, the first set of legs 42 is positioned adjacent the first longitudinally opposed end 14 of the cutting board 12, and the second set of legs 44 is positioned adjacent the second longitudinally opposed end 16 of the cutting board 12. The legs 44 of the second set are longer than the legs 42 of the first set, thus inclining the cutting board 12 downward toward first end 14, allowing the liquid to flow by gravity toward and into the liquid collection reservoir 26.

Figure 4:
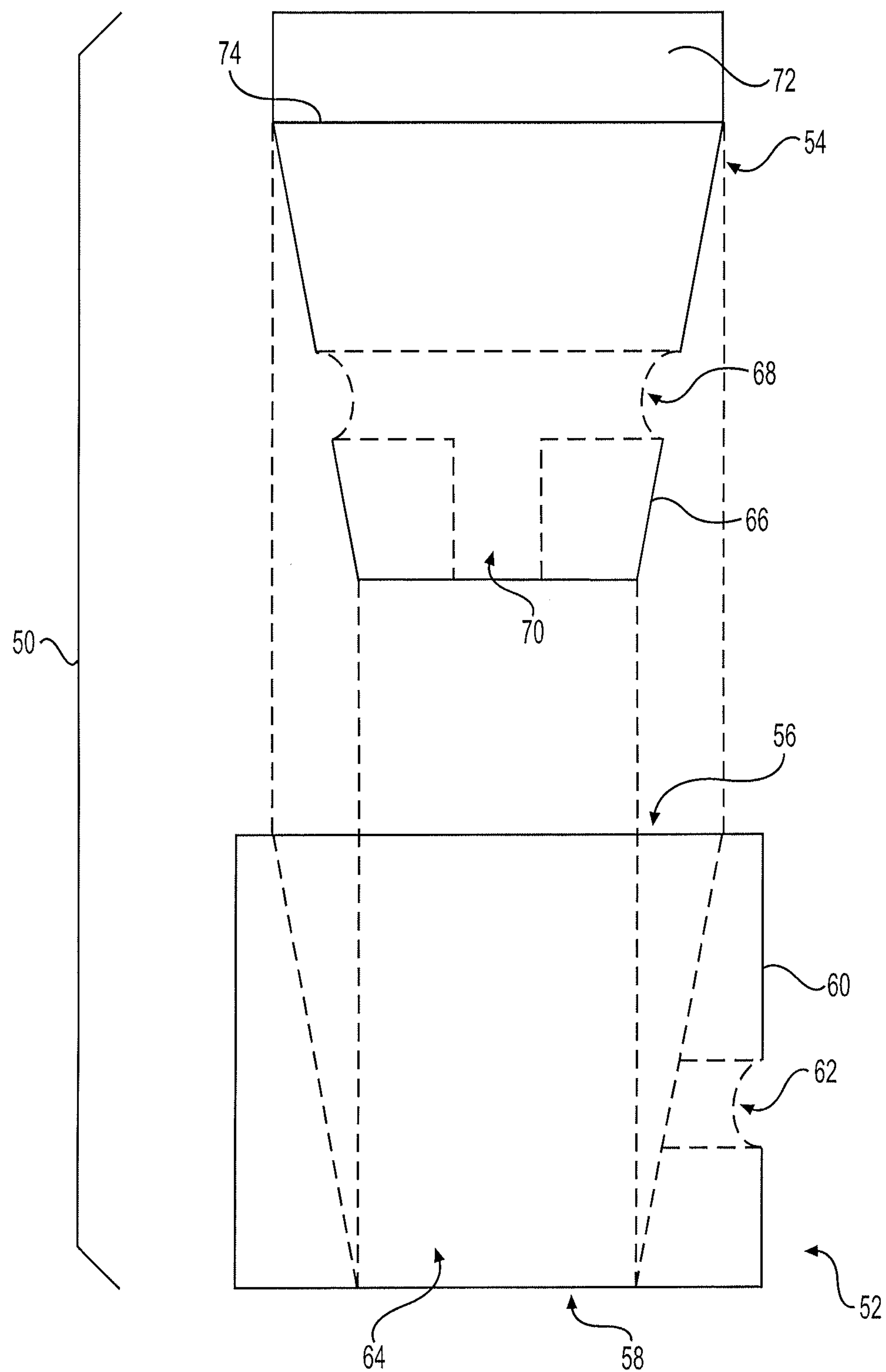
FIG. 4 is an exploded side view of the drainage valve of the cutting board of FIG. 1.

It should be understood that the drainage valve 50 may be any suitable type of valve allowing for the selective drainage of liquid from the liquid collection reservoir 26 to drainage port 30, formed through the lower surface 24. FIGS. 3 and 4 illustrate an exemplary barrel-type valve 50, which includes an outer portion 52 and an inner portion 54. The outer portion 52 has at least one sidewall 60, an open upper end 56 and an open lower end 58, and defines a vertical passage 64 extending completely through the outer portion 52 and in open communication with the open upper end 56 and the open lower end 58. A longitudinally extending passage 62 is formed through the at least one sidewall 60 and is in open communication with the vertical passage 64. In use, the liquid drains from liquid collection reservoir 26 into drainage valve 50 through the longitudinally extending passage 62. The open lower end 58 is aligned with the drainage port 30 formed through the lower surface 24 adjacent the first longitudinally opposed end 14.

The inner portion 54 of the exemplary drainage valve 50 includes a main body member 66 adapted for rotatable reception within the vertical passage 64 of the outer portion 52. As shown in FIG. 4, the main body member 66 may be tapered for reception within a correspondingly tapered vertical passage 64, allowing for secure mating between the inner portion 54 and the outer portion 52. The inner portion 54 has first and second passages 68, 70, respectively, defined therein. The first and second passages 68, 70 are in open communication with one another, and the second passage is in open communication with the open lower end 58 of the outer portion 52. The first passage 68 is in selective communication with the longitudinally extending passage 62 of the outer portion 52 through selective rotation of the inner portion 54 with respect to the outer portion 52.

Thus, when the inner portion 54 is in the angular position illustrated in FIG. 5A, in which the first passage 68 is aligned with the longitudinally extending passage 62, the liquid is free to drain from liquid collection reservoir 26, through longitudinally extending passage 62, into first passage 68, and down through second passage 70. Second passage 70 is in open communication with drainage port 30, allowing for the liquid to be drained into a desired waste receptacle. When the user is not prepared to drain the liquid, the inner portion 54 is rotated 90°, for example, from the angular position illustrated in FIG. 5A, removing first passage 68 from alignment with the longitudinally extending passage 62 and closing the drainage valve 50. As shown, a gripping member 72 is preferably mounted on a top surface of the main body member 66 of the inner portion 54, allowing the user to easily rotate the inner portion 54 with respect to the outer portion 52.

As described above, the drainage valve 50 is shown for exemplary purposes, and any suitable type of drainage valve may be utilized. As shown in FIG. 3, for a cylindrical drainage valve, such as exemplary drainage valve 50, a cylindrical passage 80 may be formed through the cutting board 12 adjacent the first longitudinally opposed end 14, the lower end of the passage 80 defining the drainage port 30. The outer portion 52 may then be securely received within the cylindrical passage 80. Alternatively, the outer portion 52 may be integrally formed as part of cutting board 12 if the cutting board 12 is made from molded plastic or the like.

It is to be understood that the cutting board with a drainage valve is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A cutting board with a drainage valve, comprising:

a body having first and second longitudinally opposed ends, first and second laterally opposed sides, a lower surface, and an upper surface, the upper surface defining a workspace adapted for cutting and processing foodstuffs, the workspace having a periphery;

a liquid collection reservoir disposed between the workspace and the first longitudinally opposed end, the reservoir extending between the laterally opposed sides;

a peripheral channel extending around the periphery of the workspace, the channel fluidly connecting with the reservoir;

a drainage port defined in the first longitudinally opposed end of the body, the port having an opening defined in the lower surface;

a drain valve disposed in the first longitudinally opposed end of the body and extending into the drainage port; and a conduit extending between the drain valve and the liquid collection reservoir, the drain valve having an open position permitting flow of liquid waste from cut foodstuffs between the reservoir and the drain port opening, and a closed position blocking flow of the liquid waste from the reservoir to the drainage port.

2. The cutting board with a drainage valve as recited in claim 1, wherein at least a portion of the peripheral channel is inclined downward from the second longitudinally opposed end toward the first longitudinally opposed end.

3. The cutting board with a drainage valve as recited in claim 1, wherein the liquid collection reservoir has a floor sloping downward from the laterally opposed sides towards the conduit extending to the drain valve.

4. The cutting board with a drainage valve as recited in claim 1, further comprising a plurality of legs extending from the lower surface of the cutting board.

5. The cutting board with a drainage valve as recited in claim 1, wherein the plurality of legs comprise a first set of legs and a second set of legs, the first set of legs being adjacent the first longitudinally opposed end of the cutting board, the second set of legs being adjacent the second longitudinally opposed end of the cutting board, the second set of legs being longer than the first set of legs.

6. The cutting board with a drainage valve as recited in claim 1, wherein said drainage valve comprises:

an outer portion having at least one sidewall, an open upper end and an open lower end, the outer portion defining a vertical passage extending between the open upper end and the open lower end and defining a longitudinally extending between the at least one sidewall and the vertical passage; and an inner portion including a main body member rotatable within the vertical passage of the outer portion, the main body member having first and second passages defined therein, the first and second passages being in open communication with one another, the second passage being in open communication with the open lower end of the outer portion, the first passage being in selective communication with the longitudinally extending passage of the outer portion through selective rotation of the inner portion with respect to the outer portion.

7. The cutting board with a drainage valve as recited in claim 6, wherein said drainage valve further comprises a gripping member mounted on the main body member of the inner portion.

8. A cutting board with a drainage valve, comprising:

a body having first and second longitudinally opposed ends, first and second laterally opposed sides, a lower surface, and an upper surface, the upper surface defining a workspace adapted for cutting and processing foodstuffs, the workspace having a periphery;

a liquid collection reservoir disposed between the workspace and the first longitudinally opposed end, the reservoir extending between the laterally opposed sides;

a peripheral channel extending around the periphery of the workspace, the channel fluidly connecting with the reservoir;

a drainage port defined in the first longitudinally opposed end of the body, the port having an opening defined in the lower surface;

a drain valve disposed in the first longitudinally opposed end of the body and extending into the drainage port; and a conduit extending between the drain valve and the liquid collection reservoir, the drain valve having an open position permitting flow of liquid waste from cut foodstuffs between the reservoir and the drain port opening, and a closed position blocking flow of the liquid waste from the reservoir to the drainage port; and a plurality of legs extending from the lower surface of the cutting board.

9. The cutting board as recited in claim 8, wherein at least a portion of the peripheral channel is inclined downward from the second longitudinally opposed end toward the first longitudinally opposed end.

10. The cutting board as recited in claim 8, wherein the liquid collection reservoir has a floor sloping downward from the laterally opposed sides towards the conduit extending to the drain valve.

11. The cutting board as recited in claim 8, wherein the plurality of legs comprise a first set of legs and a second set of legs, the first set of legs being adjacent the first longitudinally opposed end of the cutting board, the second set of legs being adjacent the second longitudinally opposed end of the cutting board, the second set of legs being longer than the first set of legs.

12. The cutting board as recited in claim 8, wherein said drainage valve comprises:

an outer portion having at least one sidewall, an open upper end and an open lower end, the outer portion defining a vertical passage extending between the open upper end and the open lower end and defining a longitudinally extending between the at least one sidewall and the vertical passage; and an inner portion including a main body member rotatable within the vertical passage of the outer portion, the main body member having first and second passages defined therein, the first and second passages being in open communication with one another, the second passage being in open communication with the open lower end of the outer portion, the first passage being in selective communication with the longitudinally extending passage of the outer portion through selective rotation of the inner portion with respect to the outer portion.

13. The cutting board as recited in claim 12, wherein said drainage valve further comprises a gripping member mounted on the main body member of the inner portion.

* * * * *